US012768992B2

(12) United States Patent
Zhu

(10) Patent No.: US 12,768,992 B2
(45) Date of Patent: Oct. 20, 2026

(54) HORIZONTAL CORRECTION METHOD FOR DETECTION PLATFORM, ELECTRONIC DEVICE, AND STORAGE MEDIUM

(71) Applicant: TRIPLE WIN TECHNOLOGY(SHENZHEN) CO. LTD., Shenzhen (CN)

(72) Inventor: Cong Zhu, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 1121 days.

(21) Appl. No.: 17/873,332

(22) Filed: Jul. 26, 2022

(65) Prior Publication Data

US 2023/0025149 A1 Jan. 26, 2023

(30) Foreign Application Priority Data

Jul. 26, 2021 (CN) ......................... 202110845226.1

(51) Int. Cl.
*G01S 17/42* (2006.01)
*G01S 7/497* (2006.01)

(52) U.S. Cl.
CPC ............ *G01S 17/42* (2013.01); *G01S 7/4972* (2013.01)

(58) Field of Classification Search
CPC ........ G01S 17/42; G01S 7/4972; G01S 17/88; G01C 15/00; G01C 9/00; G01B 11/00
See application file for complete search history.

(56) References Cited

U.S. PATENT DOCUMENTS 5,777,899 A * 7/1998 Kumagai ............... G01C 15/00 33/291
2012/0105833 A1* 5/2012 Wu .................... G01M 11/0221 356/138
2015/0330776 A1* 11/2015 Hayashi ................. G02B 21/34 356/138
2023/0178335 A1* 6/2023 Mizumura ................ G03F 7/20 250/396 R

FOREIGN PATENT DOCUMENTS

CN 102455172 5/2012
KR 100503261 B1 * 7/2005
TW 201743402 A * 12/2017

* cited by examiner

*Primary Examiner* — Yuqing Xiao
*Assistant Examiner* — Rachel Nguyen
(74) *Attorney, Agent, or Firm* — ScienBiziP, P.C.

(57) ABSTRACT

A horizontal correction method for a detection platform implemented in an electronic device includes controlling a laser device to emit laser to a plurality of points on a motion platform and calculates a height value of each of the plurality of points, calculating tilt data of the motion platform according to the height value of each of the plurality of points; determining position compensation data of the motion platform according to the tilt data; and controlling the motion platform to move according to the position compensation data, and adjusting a position of the motion platform to a horizontal position.

14 Claims, 5 Drawing Sheets

HORIZONTAL CORRECTION METHOD FOR DETECTION PLATFORM, ELECTRONIC DEVICE, AND STORAGE MEDIUM

FIELD

The subject matter herein generally relates to position correction, and particularly to an electronic device, a horizontal correction method for a detection platform, and a storage medium.

BACKGROUND

In manufacture of smart devices such as smart phones, personal computers, etc., assembly accuracy of camera modules should be high. AA (Active Alignment) process is key in the assembly process of camera modules, and is used to determine the relative positions of accessories of the camera modules such as lenses and sensors, to ensure high-quality imaging. The AA process has strict requirements on the horizontal position of the sensor assembly platform. During the sensor assembly process, it is necessary to shut down frequently and use a jig to determine any tilt of the assembly platform, and to correct any non-horizontalness of the assembly platform. However, such frequent shutdowns affect production efficiency.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
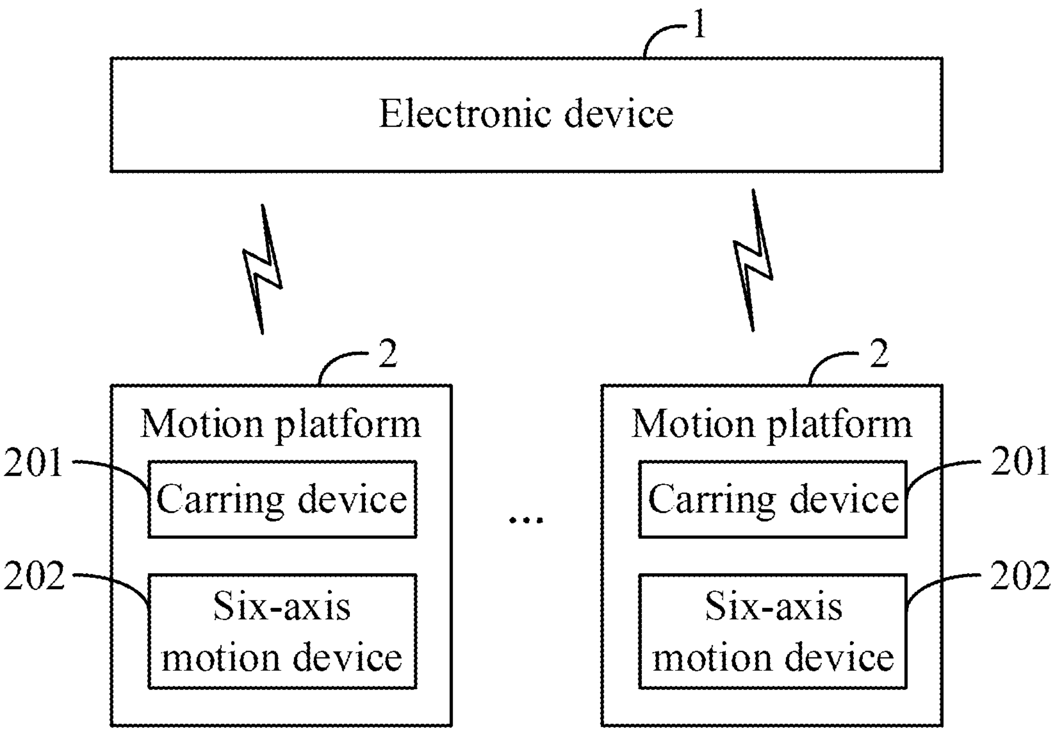
FIG. 1 is a schematic view of an embodiment of an application environment of an electronic device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Referring to FIG. 1, an electronic device 1 is illustrated. In one embodiment, the electronic device 1 can communicate with a number of motion platforms 2 through a network. The network can be wired network or wireless network, the wireless network can be radio, WI-FI, or cellular network. The cellular network can be a 4G network or a 5G network.

The electronic device 1 may be an electronic device with a horizontal correction program installed, the electronic device may be a personal computer, a server, etc., the server may be a single server, a server cluster, or the like.

In one embodiment, the motion platform 2 includes, but is not limited to, a carrying device 201 and a six-axis motion device 202. The carrying device 201 carries a first component, the six-axis motion device 202 can be a high-precision motion platform including six moving joints, and the carrying device 201 is arranged on the six-axis motion device 202. In one embodiment, the first component may be an image sensor.

The motion platform (i.e., detection platform) 2 can be a part of an Active Alignment (AA) device. The AA device is used for aligning and assembling camera modules. When assembling the component of the camera module, the AA device aligns the component with another component, so that the components such as the lens and the image sensors, can be assembled in place, the AA device can adjust a position of the lens along six degrees of freedom, the six degrees of freedom includes moving along an X-axis of a three-dimension (3D) rectangular coordinate, moving along a Y-axis of the 3D rectangular coordinate, moving along a Z-axis of the 3D rectangular coordinate, rotating around the X-axis, rotating around the Y-axis, and rotating around the Z-axis, that is, three motion degrees of freedom X, Y, and Z, and three rotation degrees of freedom Ox, Oy, and Oz. The assembly tolerance of the camera module can thus be reduced, thereby improving the consistency of camera products.

An initial position of the motion platform (i.e., detection platform) 2 is in a horizontal position, however, during an assembly process of the camera module, the position of the motion platform 2 may be shifted due to frequent motion and other factors. In this way, as long as the lens is kept horizontal, the assembly position of the camera module may deviate, which can result in defective products.

Figure 2:
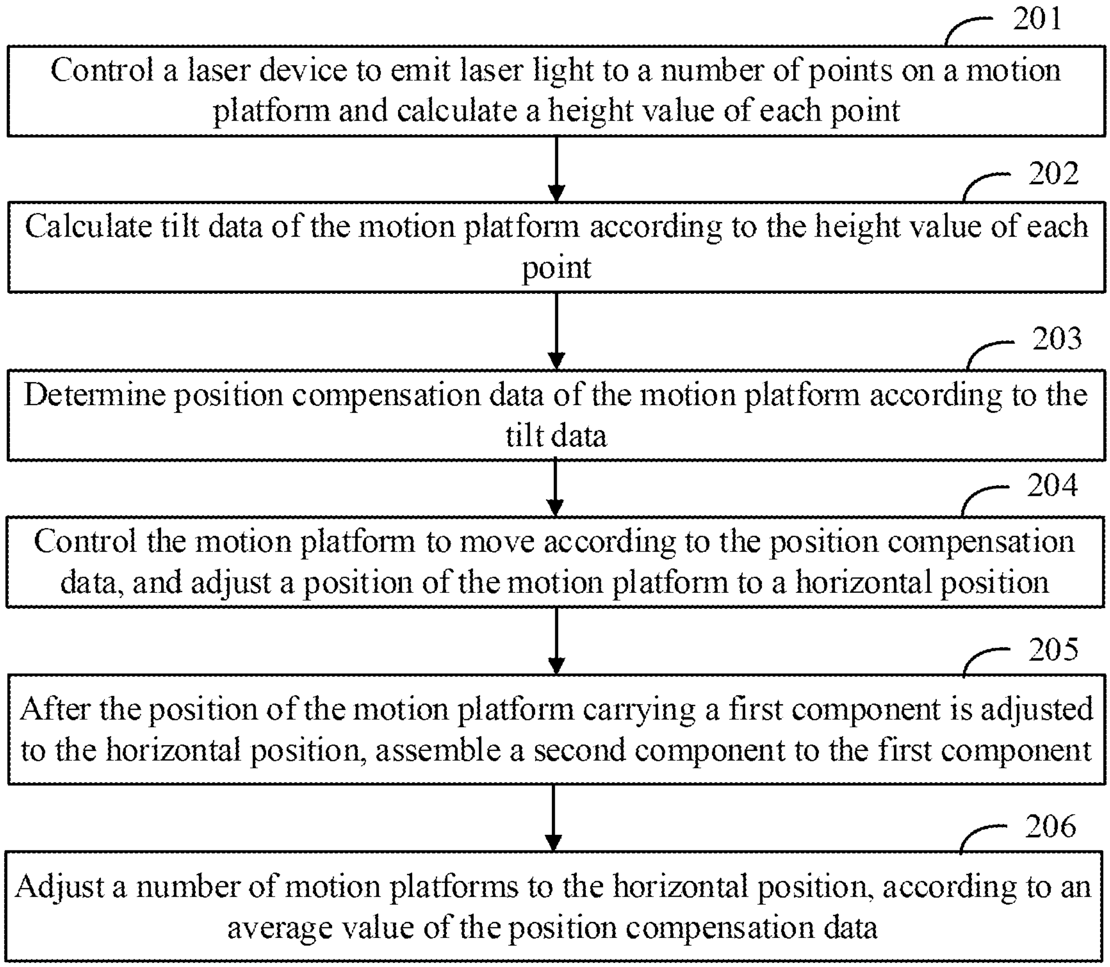
FIG. 2 illustrates a flowchart of an embodiment of a horizontal correction method according to the present disclosure.

FIG. 2 illustrates a flowchart of a horizontal correction method for a detection platform in one embodiment. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, controlling a laser device to emit laser light to a number of points on the motion platform and calculating a height value of each point.

Figure 3:
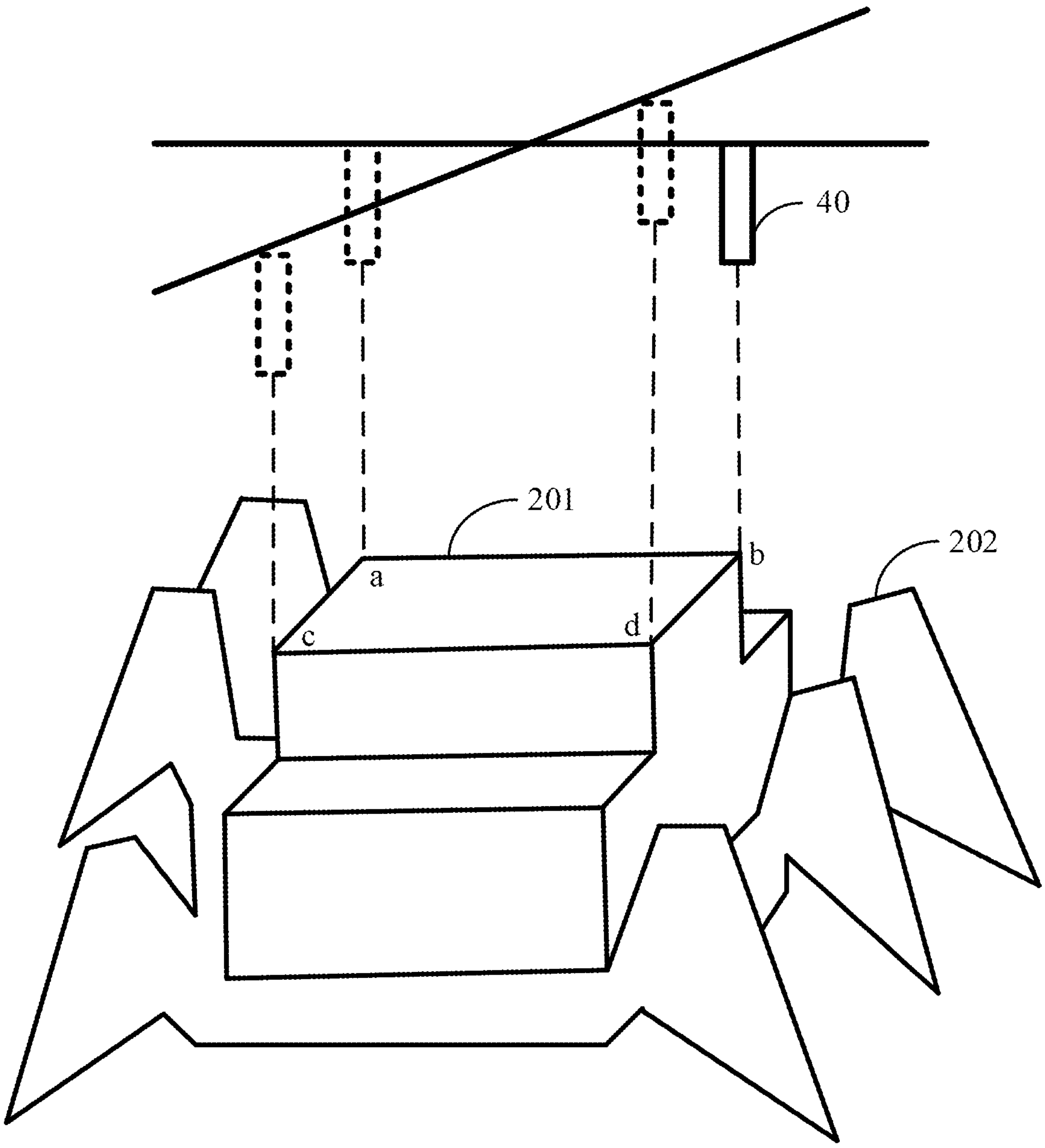
FIG. 3 is a schematic view of an embodiment of a motion platform according to the present disclosure.

Referring to FIG. 3, in one embodiment, the number of points on the motion platform includes four endpoints, and the four endpoints define a plane of the motion platform 2, and the plane is rectangular. Controlling a laser device to emit laser light to a number of points on the motion platform and calculating a height value of each point includes: controlling the laser device to move to one side of the plane, controlling the laser device to move to right above each of the four endpoints, and emit the laser light to each of the four endpoints and receive reflected laser light, determine the height value of each of the four endpoints by calculating a distance between the laser device and each of the four endpoints by means of laser ranging. The height value of each endpoints is thus determined.

In one embodiment, the laser device 40 is movably mounted on a bracket and kept in a horizontal position. The laser device 40 can slide along the bracket through a sliding mechanism such as a sliding rail. While moving, the laser device 40 emits the laser light along the edge of the plane of the motion platform 2 and receives the reflected laser light, and determines four critical points at the intersection of any two edges of the plane by going though all points of the edges of the plane, the laser device 40 can receive the reflected laser at the four critical points, and the four critical points are taken as the four endpoints of the motion platform 2.

When the laser device 40 emits the laser light to the critical point, the reflected laser is to be received in a threshold time. When the laser device 40 emits the laser light to the next point, but does not receive the reflected laser or the time interval from emitting the laser light to receiving the reflected laser exceeds the threshold time, it is taken that the next critical point exceeds or is beyond the edge of plane. Thereby, critical points can be determined to be the endpoints of the plane.

In other embodiments, it is not necessary to determine the precise endpoints of the plane on the motion platform 2, and the laser device 40 can be controlled to move to above each of four end positions of the plane, emit the laser light and receive the reflected laser light, the four positions that reflects the laser on the plane being taken as the four endpoints.

At block 202, calculating tilt data of the motion platform 2 according to the height value of each point.

In one embodiment, the tilt data includes a height difference between each of the four endpoints and the horizontal position. Calculating tilt data of the motion platform 2 includes according to the height value of each point: calculating an average value of the height values of the four endpoints, subtracting the average value from the height value of each endpoint, and obtaining the height difference between each endpoint and the horizontal position.

As illustrated in FIG. 3, for example, the height value of the endpoint a is 50 cm, the height value of the endpoint b is 55 cm, the height value of the endpoint c is 45 cm, and the height value of the endpoint d is 40 cm. The average value of the height values of the four endpoints is 47.5 cm, then the height difference between the endpoint a and the horizontal position a1=50-47.5 cm=2.5 cm, the height difference between the endpoint b and the horizontal position b1=55-47.5 cm=7.5 cm, the height difference between the endpoint c and the horizontal position c1=45-47.5 cm=−2.5 cm, and the height difference between the endpoint d and the horizontal position d1=40-47.5 cm=−7.5 cm.

In another embodiment, the tilt data includes a tilt direction and a tilt angle of the motion platform 2. Calculating tilt data of the motion platform 2 includes: calculating the height difference between two endpoints of the plane on the motion platform 2, calculating the tilt angle according to the height difference between two endpoints of the plane and a length of a side between the two endpoints, and determining the tilt direction according to the tilt angle. The length of the side between the two endpoints is a known quantity and is equal to the length of a side of the carrying device 201.

Figure 4:
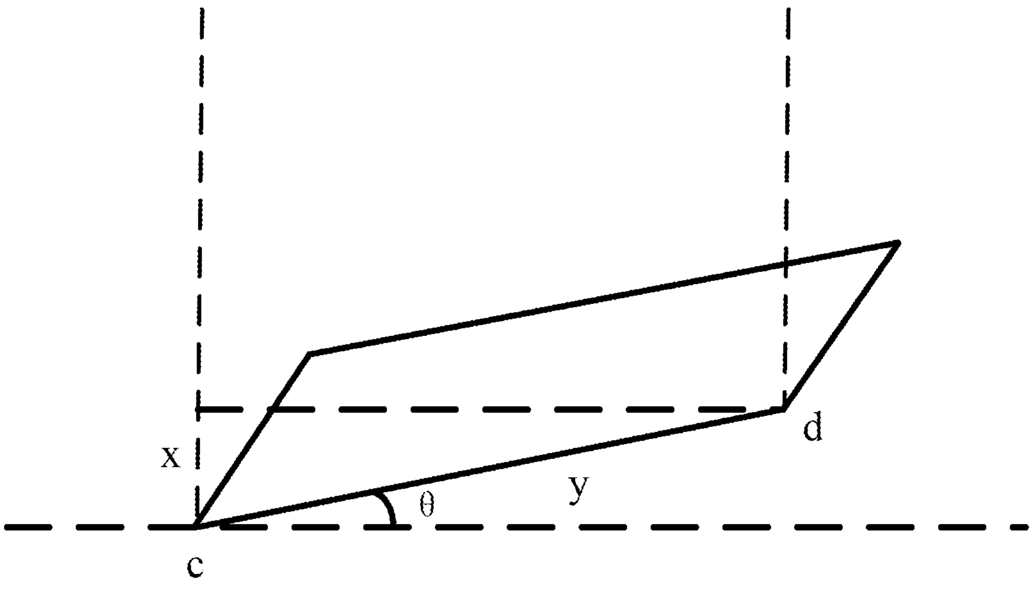
FIG. 4 is a schematic view of an embodiment of a tilt angle of the motion platform according to the present disclosure.

Referring to FIG. 4, for example, the height value of the endpoint c is 45 cm, and the height value of the endpoint d is 40 cm, then the height difference between the endpoint c and the endpoint d is x=45−40 cm=5 cm. The plane is between the endpoint c and the endpoint d. The length y of the side between them is 10 cm. According to the right triangle in FIG. 4, the tilt angle of the plane on the motion platform 2 is $\theta=90°-\arccos(x/y)=30°$. The tilt angle of the plane is the inclination angle of the motion platform 2, that is, the motion platform 2 is tilted up relative to the horizontal position. Therefore, the tilt direction is tilted up or tilted counterclockwise.

At block 203, determining position compensation data of the motion platform 2 according to the tilt data.

In one embodiment, the position compensation data includes a moving direction and a moving distance of the motion platform 2. Determining position compensation data of the motion platform 2 according to the tilt data includes: determining the moving direction and moving distance of the motion platform 2 according to the height difference between the each of the four endpoints and the horizontal position. If the height difference between an endpoint and the horizontal position is greater than 0, it means that the endpoint is higher than the horizontal position, and the moving direction of the endpoint must be down. If the height difference between an endpoint and the horizontal position is equal to 0, it means that the endpoint is in the horizontal position, and the endpoint is not required to move. If the height difference between an endpoint and the horizontal position is less than 0, it means that the endpoint is lower than the horizontal position, and the movement direction of the endpoint must be up.

In another embodiment, the position compensation data includes a rotation direction and a rotation angle of the motion platform 2. Determining position compensation data of the motion platform 2 according to the tilt data includes: determining the rotation direction and rotation angle of the motion platform 2 according to the tilt direction and tilt angle. The rotation direction is the opposite direction of the tilt direction, and the rotation angle and the tilt angle are the same. That is, the rotation direction of the motion platform 2 is determined to be the opposite direction of the tilt direction, and the rotation angle of the motion platform 2 is determined to be the tilt angle.

If the tilt direction is up, the rotation direction is down. If the tilt direction is down, the rotation direction is up. That is, if the tilt direction is counterclockwise, the rotation direction is clockwise. If the tilt direction is clockwise, the rotation direction is counterclockwise.

At block 204, controlling the motion platform 2 to move according to the position compensation data, and adjusting a position of the motion platform 2 to a horizontal position.

In one embodiment, controlling the motion platform 2 to move according to the position compensation data, and adjusting a position of the motion platform 2 to a horizontal position includes: controlling the six-axis motion device 202 to adjust the position of the motion platform 2 to the horizontal position according to the position compensation data. The six-axis motion device 202 is equipped with a motor and the processor of the electronic device 1 includes a Programmable Logic Controller (PLC) control system.

In one embodiment, the PLC control system generates a pulse signal according to the moving direction and moving distance, sends the pulse signal to the motor of the six-axis motion device 202, and controls the motion axis of the six-axis motion device 202 to drive each of the four endpoints on the motion platform 2 to move a required distance in the correct moving direction through the motor. Based on the above example, the endpoint a is driven to move down a distance of 2.5 cm, the endpoint b is driven to move down a distance of 7.5 cm, the endpoint c is driven to move up a distance of 2.5 cm, and the endpoint d is driven to move up a distance of 7.5 cm.

It should be noted that, when the six-axis motion device 202 controls the movement of the motion platform 2, the center position of the motion platform 2 remains fixed in space. The center position is the geometric center of the motion platform 2.

In another embodiment, a pulse signal is generated by the PLC control system according to the rotation direction and rotation angle, and the pulse signal is sent to the motor of the six-axis motion device 202. The six-axis motion device 202 is controlled by the motor to drive the motion platform 2 to rotate by a required rotation angle in the rotation direction. Based on the above example, the motion platform 2 is driven to rotate 30 degrees clockwise, so as to bring the motion platform 2 to the horizontal position.

It should be noted that, when the six-axis motion device 202 controls the rotation of the motion platform 2, the center position of the motion platform 2 again remains unchanged. The center position is the geometric center of the motion platform 2.

At block 205, after the position of the motion platform 2 carrying the first component is adjusted to the horizontal position, assembling a second component to the first component.

In one embodiment, the second component can be a lens, and the first component and the second component are assembled together to form a camera module.

At block 206, adjusting a number of motion platforms to the horizontal position, according to an average value of the position compensation data of a preset number of motion platforms or the position compensation data determined within a preset time period.

In one embodiment, the preset number can be 10, and the preset time period can be one hour. It should be noted that, after adjusting the positions of the preset number of the motion platforms 2 to the horizontal position, or after adjusting the position of at least one motion platform 2 to the horizontal position within the preset time period, in order to save the subsequent horizontal correction time of the motion platform 2, further adjustment can be directly based on the average value of the position compensation data of the preset number of the motion platforms 2, or the position compensation data of the at least one motion platform 2 that is completed the horizontal correction within the preset time period. The average value of the position compensation data of the other motion platforms can improve the correction efficiency, thereby improving the assembly efficiency.

In one embodiment, the method further includes: displaying the tilt data and the position compensation data of the motion platform 2 on a display device.

Figure 5:
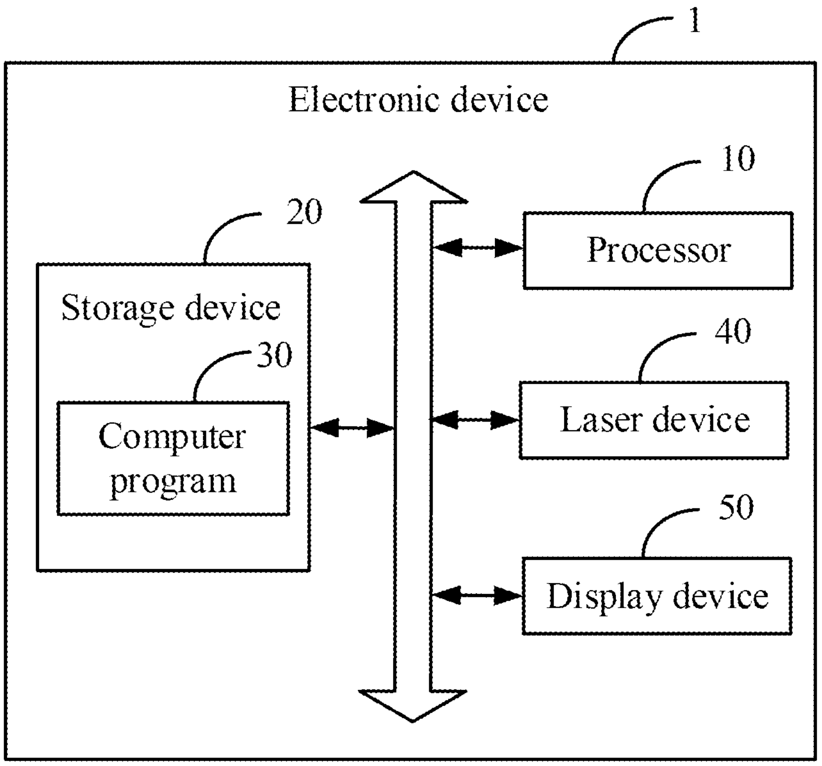
FIG. 5 is a block diagram of an embodiment of the electronic device according to the present disclosure.

FIG. 5 illustrates the electronic device 1 in one embodiment. The electronic device 1 includes, but is not limited to, a processor 10, a storage device 20, a computer program 30, a laser device 40, and a display device 50. FIG. 5 illustrates only one example of the electronic device 1. Other examples can include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

The storage device 20 stores instructions, the processor 10 executes the computer program 30 stored in the storage device 20 for implementing the horizontal correction method provided in the embodiments of the present disclosure. The computer program 30 can be a horizontal correction program and includes instructions.

The processor 10 is configured to:

control a laser device to emit laser light to a plurality of points on a motion platform and calculate a height value of each of the plurality of points;

calculate tilt data of the motion platform according to the height value of each of the plurality of points;

determine position compensation data of the motion platform according to the tilt data; and control the motion platform to move according to the position compensation data, and adjust a position of the motion platform to a horizontal position;

after the position of the motion platform 2 carrying the first component is adjusted to a horizontal position, assemble the second component to the first component;

adjust a plurality of motion platforms to the horizontal position, according to an average value of the position compensation data of a preset number of motion platforms or the position compensation data determined within a preset time period.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:

at least one processor; and a storage device coupled to the at least one processor and storing instructions for execution by the at least one processor to cause the at least one processor to:

control a laser device to emit laser light to four endpoints on a motion platform and calculate a height value of each of the plurality of points;

control the laser device to move to one side of a plane, the plane being defined by the four endpoints of the motion platform;

control the laser device to move to right above each of the four endpoints, and emit the laser light to each of the four endpoints and receive reflected laser light;

determine the height value of each of the four endpoints by calculating a distance between the laser device and each of the four endpoints;

calculate tilt data of the motion platform according to the height value of each of the plurality of points;

calculate an average value of the height values of the four endpoints;

obtain the height difference between each of the four endpoints and a horizontal position by subtracting the average value from the height value of each of the four endpoints;

determine a moving direction and a moving distance of the motion platform according to the height difference between each of the four endpoints and the horizontal position;

determine position compensation data of the motion platform according to the tilt data; and control the motion platform to move according to the position compensation data, and adjust a position of the motion platform to the horizontal position.

2. The electronic device according to claim 1, wherein the motion platform carries a first component, the at least one processor is further caused to:

after the position of the motion platform carrying the first component is adjusted to the horizontal position, assemble a second component to the first component.

3. The electronic device according to claim 1, wherein the tilt data comprises a tilt direction and a tilt angle of the motion platform, the at least one processor is further caused to:

calculate a height difference between two endpoints of the plane on the motion platform;

calculate the tilt angle according to the height difference between the two endpoints and a length of a side between the two endpoints;

determine the tilt direction according to the tilt angle; and determine a rotation direction of the motion platform to be an opposite direction of the tilt direction, and determine a rotation angle of the motion platform to be the tilt angle.

4. The electronic device according to claim 1, wherein the at least one processor is further caused to:

control a six-axis motion device to adjust the position of the motion platform to the horizontal position according to the position compensation data.

5. The electronic device according to claim 1, wherein the at least one processor is further caused to:

adjust a plurality of motion platforms to the horizontal position, according to an average value of the position compensation data of a preset number of motion platforms or the position compensation data determined within a preset time period.

6. The electronic device according to claim 1, wherein the at least one processor is further caused to:

display the tilt data and the position compensation data of the motion platform on a display device.

7. A horizontal correction method for a detection platform implemented in an electronic device comprising:

controlling a laser device to emit laser light to four endpoints on a motion platform and calculating a height value of each of the plurality of points, comprising:

controlling the laser device to move to one side of a plane, the plane being defined by the four endpoints of the motion platform;

controlling the laser device to move to right above each of the four endpoints, and emit the laser light to each of the four endpoints and receive reflected laser light;

determining the height value of each of the four endpoints by calculating a distance between the laser device and each of the four endpoints;

calculating tilt data of the motion platform according to the height value of each of the plurality of points, comprising:

calculating an average value of the height values of the four endpoints;

obtaining the height difference between each of the four endpoints and a horizontal position by subtracting the average value from the height value of each of the four endpoints;

determining a moving direction and a moving distance of the motion platform according to the height difference between each of the four endpoints and the horizontal position;

determining position compensation data of the motion platform according to the tilt data; and controlling the motion platform to move according to the position compensation data, and adjusting a position of the motion platform to the horizontal position.

8. The method according to claim 7, further comprising:

after the position of the motion platform carrying a first component is adjusted to the horizontal position, assembling a second component to the first component.

9. The method according to claim 7, wherein the tilt data comprises a tilt direction and a tilt angle of the motion platform, and calculating tilt data of the motion platform according to the height value of each of the plurality of points comprises:

calculating a height difference between two endpoints of the plane on the motion platform;

calculating the tilt angle according to the height difference between the two endpoints and a length of a side between the two endpoints;

determining the tilt direction according to the tilt angle; and determining a rotation direction of the motion platform to be an opposite direction of the tilt direction, and determining a rotation angle of the motion platform to be the tilt angle.

10. The method according to claim 7, wherein adjusting a position of the motion platform to a horizontal position comprises:

controlling a six-axis motion device to adjust the position of the motion platform to the horizontal position according to the position compensation data.

11. The method according to claim 7, further comprising:

adjusting a plurality of motion platforms to the horizontal position, according to an average value of the position compensation data of a preset number of motion platforms or the position compensation data determined within a preset time period.

12. The method according to claim 7, further comprising:

displaying the tilt data and the position compensation data of the motion platform on a display device.

13. A non-transitory computer-readable storage medium having instructions stored thereon, when the instructions are executed by a processor of an electronic device, the processor is configured to perform a horizontal correction method for a detection platform, wherein the method comprises:

controlling a laser device to emit laser light to four endpoints on a motion platform and calculating a height value of each of the plurality of points, comprising:

controlling the laser device to move to one side of a plane, the plane being defined by the four endpoints of the motion platform;

controlling the laser device to move to right above each of the four endpoints, and emit the laser light to each of the four endpoints and receive reflected laser light;

determining the height value of each of the four endpoints by calculating a distance between the laser device and each of the four endpoints;

calculating tilt data of the motion platform according to the height value of each of the plurality of points, comprising:

calculating an average value of the height values of the four endpoints;

obtaining the height difference between each of the four endpoints and a horizontal position by subtracting the average value from the height value of each of the four endpoints;

determining a moving direction and a moving distance of the motion platform according to the height difference between each of the four endpoints and the horizontal position;

determining position compensation data of the motion platform according to the tilt data; and controlling the motion platform to move according to the position compensation data, and adjusting a position of the motion platform to the horizontal position.

14. The non-transitory computer-readable storage medium according to claim 13, wherein the tilt data comprises a tilt direction and a tilt angle of the motion platform, and calculating tilt data of the motion platform according to the height value of each of the plurality of points comprises:

calculating a height difference between two endpoints of the plane on the motion platform;

calculating the tilt angle according to the height difference between the two endpoints and a length of a side between the two endpoints;

determining the tilt direction according to the tilt angle; and determining a rotation direction of the motion platform to be an opposite direction of the tilt direction, and determining a rotation angle of the motion platform to be the tilt angle.

* * * * *